(12) United States Patent
Shea et al.

(10) Patent No.: US 11,454,578 B2
(45) Date of Patent: Sep. 27, 2022

(54) PASSIVE SAMPLER AND METHODS OF MAKING

(71) Applicant: North Carolina State University, Raleigh, NC (US)

(72) Inventors: Damian Shea, Raleigh, NC (US); Xiang Q. Kong, Raleigh, NC (US); Xin-Rui Xia, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 855 days.

(21) Appl. No.: 16/091,704

(22) PCT Filed: Apr. 7, 2017

(86) PCT No.: PCT/US2017/026538
§ 371 (c)(1),
(2) Date: Oct. 5, 2018

(87) PCT Pub. No.: WO2017/177099
PCT Pub. Date: Oct. 12, 2017

(65) Prior Publication Data
US 2019/0162638 A1 May 30, 2019

Related U.S. Application Data

(60) Provisional application No. 62/319,328, filed on Apr. 7, 2016.

(51) Int. Cl.
*G01N 1/40* (2006.01)
*B01D 69/10* (2006.01)
(Continued)

(52) U.S. Cl.
CPC .......... *G01N 1/4005* (2013.01); *B01D 15/00* (2013.01); *B01D 15/08* (2013.01); *B01D 69/02* (2013.01);
(Continued)

(58) Field of Classification Search
CPC ...... G01N 1/4005; B01D 15/08; B01D 69/02; B01D 69/10; B01J 20/2808; B01J 20/28035; B01J 20/28038
See application file for complete search history.

(56) References Cited

U.S. PATENT DOCUMENTS 4,774,001 A * 9/1988 Degen ................. A41D 31/102
210/490
5,366,631 A * 11/1994 Adiletta ............... B01D 39/163
210/651

(Continued)

OTHER PUBLICATIONS

Alvarez et al: "Development of a Passive, In Situ, Integrative Sampler for Hydrophilic Organic Contaminants in Aquatic Environments", Environmental Toxicology and Chemistry., vol. 23, No. 7, Jan. 1, 2004, pp. 1640-1648.

(Continued)

*Primary Examiner* — Lisa M Caputo
*Assistant Examiner* — Alex T Devito
(74) *Attorney, Agent, or Firm* — Thomas | Horstemeyer, LLP

(57) ABSTRACT

Described herein are passive samplers, making of such samplers, and methods of use. In an example embodiment, a passive sampling membrane comprises, for example, a continuous mesoporous sequestration media having a sequestration phase and a support membrane configured to support the sequestration phase. The sequestration phase may include a hydrophobic region and a hydrophilic region. The continuous mesoporous sequestration media may be configured to simultaneously sequester polar and non-polar organic substances.

16 Claims, 9 Drawing Sheets

(51) Int. Cl.

| | | |
|---|---|---|
| *B01D 71/28* | (2006.01) | |
| *B01J 20/28* | (2006.01) | |
| *B01D 71/44* | (2006.01) | |
| *B01D 71/80* | (2006.01) | |
| *G01N 1/22* | (2006.01) | |
| *G01N 1/10* | (2006.01) | |
| *B01D 15/00* | (2006.01) | |
| *B01J 20/32* | (2006.01) | |
| *C02F 1/28* | (2006.01) | |
| *B01D 15/08* | (2006.01) | |
| *B01D 69/02* | (2006.01) | |
| *C02F 101/30* | (2006.01) | |
| *C02F 101/36* | (2006.01) | |
| *B01D 71/52* | (2006.01) | |
| *C02F 103/00* | (2006.01) | |
| *G01N 30/72* | (2006.01) | |

(52) U.S. Cl.
CPC ............. *B01D 69/10* (2013.01); *B01D 71/28* (2013.01); *B01D 71/44* (2013.01); *B01D 71/80* (2013.01); *B01J 20/2808* (2013.01); *B01J 20/28026* (2013.01); *B01J 20/28035* (2013.01); *B01J 20/28038* (2013.01); *B01J 20/28083* (2013.01); *B01J 20/3276* (2013.01); *C02F 1/285* (2013.01); *G01N 1/10* (2013.01); *G01N 1/2273* (2013.01); *G01N 1/40* (2013.01); *B01D 71/52* (2013.01); *B01D 2325/12* (2013.01); *B01D 2325/36* (2013.01); *B01D 2325/38* (2013.01); *C02F 2101/306* (2013.01); *C02F 2101/363* (2013.01); *C02F 2101/366* (2013.01); *C02F 2103/007* (2013.01); *G01N 30/7233* (2013.01); *G01N 2001/2288* (2013.01)

(56) References Cited

U.S. PATENT DOCUMENTS

| | | | |
|---|---|---|---|
| 5,395,426 | A | 3/1995 | Huckins et al. |
| 5,853,668 | A | 12/1998 | Begg et al. |
| 5,976,367 | A * | 11/1999 | Bouvier ................. B01D 15/00 |
| | | | 210/198.2 |
| 2002/0036166 | A1 | 3/2002 | Petty et al. |
| 2004/0102587 | A1 | 5/2004 | Kim et al. |
| 2004/0211939 | A1 | 10/2004 | Elliott |
| 2006/0121217 | A1 | 6/2006 | Childs et al. |
| 2006/0247361 | A1 | 11/2006 | Shah |
| 2007/0161030 | A1 | 7/2007 | Patton |
| 2010/0323343 | A1 | 12/2010 | Egan et al. |
| 2011/0070597 | A1 * | 3/2011 | Vlahos ............... G01N 33/1826 |
| | | | 435/7.8 |
| 2017/0056834 | A1 * | 3/2017 | Bhushan .................. C08K 3/36 |

OTHER PUBLICATIONS

Huang X et al: "A novel stir bar sorptive extraction coating based on monolithic material for apolar, polar organic compounds and heavy metal ions", Talanta, Elsevier, Amsterdam, NL, vol. 78, No. 1, Apr. 15, 2009, pp. 101-106.

Kohoutek et al: "A novel approach for monitoring of cyanobacterial toxins: development and evaluation of the passive sampler for microcystins", Analytical and Bioanalytical Chemistry, Springer, Berlin, DE, vol. 390, No. 4, Dec. 28, 2007 (Dec. 28, 2007), pp. 1167-1172.

Mazzella et al: "Evaluation of the Use of Performance Reference Compounds in an Oasis-HLB Adsorbent Based Passive Sampler for Improving Water Concentration Estimates of Polar Herbicides in Freshwater", Environmental Science & Technology, vol. 44, No. 5, Mar. 1, 2010, pp. 1713-1719.

European Search Report issued in EP Application No. 17779888.1 dated Nov. 26, 2019.

International Search Report and Written Opinion for PCT/US2017/026538 dated Jun. 20, 2017.

* cited by examiner

PASSIVE SAMPLER AND METHODS OF MAKING

CROSS-REFERENCE TO RELATED APPLICATION

This application is the 35 U.S.C. § 371 national stage application of PCT Application No. PCT/US2017/026538, filed Apr. 7, 2017, where the PCT claims the benefit of and priority to U.S. Provisional Application Ser. No. 62/319,328, having the title "PASSIVE SAMPLER AND METHODS OF MAKING," filed on Apr. 7, 2016, the disclosure disclosures of which are incorporated herein in by reference in their entireties.

STATEMENT REGARDING FEDERALLY SPONSORED RESEARCH OR DEVELOPMENT

This invention was made with Government support under grant number ES005948 awarded by the National Institutes of Health. The Government has certain rights to the invention.

BACKGROUND

The release of agricultural, industrial and petroleum chemicals to the environment poses a serious threat to the ecosystem and human health. The loss of plant and animal species, birth defects in human and wild animals and epidemic diseases such as obesity are recognized to be related to the environmental contaminants. Monitoring of environmental pollutants is of fundamental importance for the protection of the ecosystem and human health.

Currently, grab water sampling is commonly used in most of the aquatic monitoring programs, in which water samples are collected at a single point in time directly into bottles and transported back to the laboratory for chemical analysis to provide a "snapshot" of the concentration in the environment at the time of sampling. Even though the grab water sampling method is the method in most of the regulatory guidelines for environmental monitoring, it has many drawbacks. It does not yield a representative measurement of the overall chemical exposure when the contaminant concentrations fluctuate over time. Episodic events, such as a spill- or storm-related runoff, are often missed due to the limited sampling frequency. And rainfall events that do not contaminate the water can dilute the concentrations. Although the representativeness can be improved by frequent sampling, the logistic and financial hurdles of collecting and analyzing repetitive samples make grab water sampling impractical and often misleading in environmental monitoring. In addition, most chemical exposure concerns are related to chronic, longer term exposure over the course of weeks or months and not acute, short term exposure that might be captured by a grab sample.

Passive sampling technology was developed to provide a means of measuring the time-weighted average (TWA) concentrations of chemicals while meeting many of the detection limit requirements of common instrumental techniques by sampling large volumes of water over prolonged exposure periods. The main advantages of passive sampling technology are (i) they provide a means of continuously monitoring the levels of pollutants in the aquatic environment, thus providing information that captures fluctuating chemical concentrations. (ii) Pollutants are accumulated in the receiving phase of the sampler to levels exceeding those in the environment, thereby enabling very low levels of contaminants to be determined. (iii) No energy input is required and they have low cost in fabrication, deployment and analysis, which is critical in large scale environmental monitoring.

SUMMARY

Embodiments of the present disclosure provide for a passive sampling membrane, methods of use of a passive sampling membrane, devices containing a passive sampling membrane, and the like.

An embodiment of the present disclosure includes a passive sampling membrane, comprising a continuous mesoporous sequestration media including a sequestration phase and a support membrane, wherein the support membrane supports the sequestration phase, wherein the sequestration phase includes a hydrophobic region and a hydrophilic region, wherein continuous mesoporous sequestration media has the characteristic of simultaneously sequestering polar and non-polar organic substances.

An embodiment of the present disclosure also includes a method for sampling substances in an environment, comprising collecting a sample with a passive sampling membrane, wherein the substances in the sample include polar organic substances, non-polar organic substances, or a combination thereof, wherein collecting includes simultaneously sequestering polar and non-polar organic substances from the environment.

An embodiment of the present disclosure also includes a device comprising a passive sampling membrane, a protective container; and a measuring device.

Other devices, membranes, methods, features, and advantages will be or become apparent to one with skill in the art upon examination of the following drawings and detailed description. It is intended that all such additional devices, membranes, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

DETAILED DESCRIPTION

Figure 1:
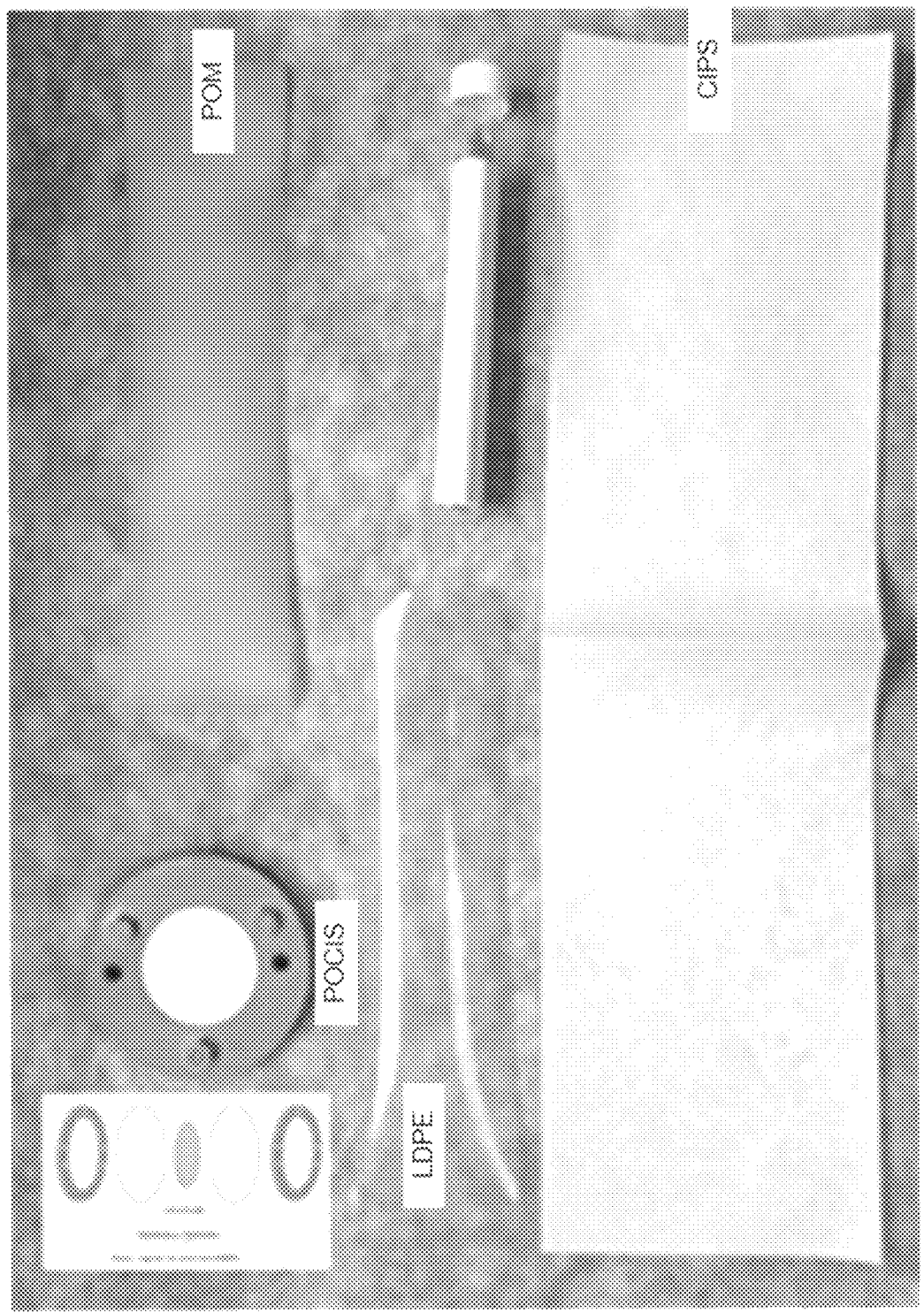
FIG. 1 is an image comparing CIPS with commonly used passive samplers.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, biology, material science, and the like, which are within the skill of the art.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

Definitions

The term "heteroatoms" can include, but are not limited to, O, N, Si, P, Se, B, and S, wherein the phosphorous and sulfur atoms are optionally oxidized, and the nitrogen heteroatom is optionally quaternized. Heteroatoms such as nitrogen may have hydrogen substituents and/or any permissible substituents of organic compounds described herein which satisfy the valences of the heteroatoms. It is understood that "substitution" or "substituted" includes the implicit proviso that such substitution is in accordance with permitted valence of the substituted atom and the substituent, and that the substitution results in a stable compound, i.e. a compound that does not spontaneously undergo transformation such as by rearrangement, cyclization, elimination, etc.

The term "substituted" as used herein, refers to all permissible substituents of the compounds described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14, 1-12, or 1-6 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, C3-C20 cyclic, substituted C3-C20 cyclic, heterocyclic, substituted heterocyclic, aminoacid, peptide, and polypeptide groups.

In a broad aspect, the permissible substituents include acyclic and cyclic, branched and unbranched, carbocyclic and heterocyclic, aromatic and nonaromatic substituents of organic compounds. Illustrative substituents include, for example, those described herein. The permissible substituents can be one or more and the same or different for appropriate organic compounds. The heteroatoms such as nitrogen may have hydrogen substituents and/or any permissible substituents of organic compounds described herein which satisfy the valences of the heteroatoms.

In various embodiments, the substituent is selected from alkoxy, aryloxy, alkyl, alkenyl, alkynyl, amide, amino, aryl, arylalkyl, carbamate, carboxy, cyano, cycloalkyl, ester, ether, formyl, halogen, haloalkyl, heteroaryl, heterocyclyl, hydroxyl, ketone, nitro, phosphate, sulfide, sulfinyl, sulfonyl, sulfonic acid, sulfonamide, and thioketone, each of which optionally is substituted with one or more suitable substituents. In some embodiments, the substituent is selected from alkoxy, aryloxy, alkyl, alkenyl, alkynyl, amide, amino, aryl, arylalkyl, carbamate, carboxy, cycloalkyl, ester, ether, formyl, haloalkyl, heteroaryl, heterocyclyl, ketone, phosphate, sulfide, sulfinyl, sulfonyl, sulfonic acid, sulfonamide, and thioketone, wherein each of the alkoxy, aryloxy, alkyl, alkenyl, alkynyl, amide, amino, aryl, arylalkyl, carbamate, carboxy, cycloalkyl, ester, ether, formyl, haloalkyl, heteroaryl, heterocyclyl, ketone, phosphate, sulfide, sulfinyl, sulfonyl, sulfonic acid, sulfonamide, and thioketone can be further substituted with one or more suitable substituents.

The term "heterocyclic" as used herein refers to compounds and/or groups with a cyclic or ring structure comprising at least two different elements as members of the ring. Heterocyclic compounds or groups can have any number of members of the ring, in some examples 2 to 9 members. Members of the ring can be substituted or unsubstituted according to previous descriptions of substitution. Examples of members of heterocyclic rings can include carbon, oxygen, nitrogen, sulfur, and boron. One or more double bonds can be present between members of the heterocyclic ring.

General Discussion

Passive sampling technology was developed to provide a means of measuring the time-weighted average (TWA) concentrations of chemicals while meeting many of the detection limit requirements of common instrumental techniques by sampling large volumes of water over prolonged exposure periods [1, 2]. The main advantages of passive sampling technology are: (i) it can provide a means of continuously monitoring the levels of pollutants in the aquatic environment, thus providing information that captures fluctuating chemical concentrations; (ii) Pollutants can be accumulated in the receiving phase of the sampler to levels exceeding those in the environment, thereby enabling very low levels of contaminants to be determined; and (iii) No energy input may be required and they can have low cost in fabrication, deployment, and analysis, all of which can be critical in large scale environmental monitoring.

U.S. Pat. No. 5,098,573 introduced a semipermeable membrane device (SPMD) for the TWA measurement of hydrophobic organic chemicals in water [3]. The sampler consists of a lay-flat low-density polyethylene (LDPE) tube (typical film thickness between 50 µm and 100 µm) filled with high purity triolein and sealed at both ends. Since both the membrane and the receiving phase are hydrophobic, SPMDs can be used only for hydrophobic contaminants, which are typically characterized by an octanol-water partition coefficient (log $K_{ow}$)>4.0 [2, 4]. To date, this sampler has been the most widely used of all passive samplers for aquatic hydrophobic contaminant measurements. SPMDs provide time-integrated concentrations for periods ranging from days to months, depending on the analyte concentration and deployment conditions. A wide range of hydrophobic compounds, including polychlorinated biphenyls (PCBs), polycyclic aromatic hydrocarbons (PAHs), organochlorine pesticides, dioxins and furans, among many other hydrophobic compounds, can be analyzed with SPMDs.

One of the drawbacks in using SPMDs is that determination of low levels of contamination in a sample using SPMDs requires extensive sample cleanup procedures [5]. After deployment, usually a dialysis procedure is performed using solvents such as hexane, followed by analytical quantification using various techniques. An alternative to that procedure is solvent extraction of both the LDPE membrane and the triolein, followed by extensive sample cleanup prior to analysis. To resolve the sampling cleanup difficulty, recently, LDPE, polydimethylsiloxane (PDMS), and polyoxymethylene (POM) polymer films have been used for passive sampling of hydrophobic contaminants in the aquatic environment, although these also can typically require some cleanup prior to analysis.

As the adverse effects from persistent hydrophobic organic pollutants has become more recognized, many persistent industrial pollutants such as PCBs and organochlorine pesticides were banned and less persistent, more water soluble chemicals were developed. However, increasing evidence shows that the large quantities of the less persistent compounds (e.g., herbicides, new generation pesticides, pharmaceuticals, etc.) entering aquatic systems can cause altered behavior, neurotoxicity, impaired reproduction, endocrine disruption, and other non-lethal chronic abnormalities in humans and wildlife [6]. The less persistent pesticides and herbicides together with the unregulated release of household chemicals, personal-care products, and pharmaceuticals form new emerging environmental pollutants, which are characterized by their polar and more water soluble physicochemical properties. The new 'emerging" polar pollutants cannot be effectively monitored by existing well-developed passive samplers such as SPMD, LDPE and PDMS because these pollutants are too polar to accumulate in the hydrophobic material of the sampler.

A polar organic chemical integrative sampler (POCIS, U.S. Pat. No. 6,478,961 B2) [7] was previously developed for monitoring the new emerging polar pollutants. The device includes a microporous hydrophilic membrane enclosure formed by a tube or facing membranes. A mixed sequestration media, contained within the enclosure, transforms dissolved polar organic chemicals into non-mobile species. The sequestration media is a triphasic admixture of a hyper-crosslinked polystyrene-divinylbenzene resin, and a carbonaceous sorbent dispersed on a size exclusion styrene-divinylbenzene copolymer. The POCIS has been used for the new emerging polar pollutants having a log $K_{ow}$ value<3, which was used as complementary sampler for the SPMD, LDPE, and PDMS samplers for non-polar compounds having log $K_{ow}$ value>4. However, the detection sensitivity of POCIS for polar compounds is ten times lower than is the SPMD for non-polar compounds due to the limited effective sampling surface area of POCIS. The effective surface area of POCIS is limited by its sandwich structure (sorbent particles sandwiched between two microporous membranes), where the loose sorbent particles could sag toward the base, causing the uneven distribution and reducing the active sampling surface area. Thus the sampling rate of the commercial POCIS is in the range of 10-250 mL/day for polar compounds, which is tens time lower than SPMD for hydrophobic compounds.

The Chemcatcher (U.S. Pat. No. 7,059,206 B1) has ensured the even distribution of the sequestration media by using an immobilized solid phase material supported by a solid support [8]. The solid support and membrane features enable the device to be adapted for use for continuously monitoring a variety of micropollutants, including polar organic, non-polar organic and inorganic analytes using different sequestration media. Furthermore, the analytes may be collected by short column extraction rather than batch extraction. The Chemcatcher can be adapted for various types of water contaminants (e.g., trace metals, polycyclic aromatic hydrocarbons, pesticides and pharmaceutical residues) depending on the materials chosen for the receiving phase and the membrane. Similar to POCIS, Chemcatcher has a limited sampling rate, for example, the sampling rate in the range of 13-170 mL/day for the pesticide atrazine using SDB-RPS-PES configuration was reported.

Unlike the SPMD, LDPE, and PDMS hydrophobic samplers, both the POCIS and Chemcatcher are not quantitative—they can sequester polar chemicals but not in a reproducible manner that allows quantitation of the amount in the water. Thus both the POCIS and CHemcatcher provide only qualitative information on what polar chemicals might be present and they have no value for assessing health risks to humans and wildlife or for enforcement of environmental regulations. In addition, none of the samplers mentioned above work well for chemicals in the intermediate polarity range having log $K_{ow}$ values between about 3-4, and this range includes many hundreds of chemicals of emerging concern and polar metabolites of the more hydrophobic chemicals.

The low sampling rate and non-quantitative nature of the POCIS and Chemcatcher for polar pollutants is one of the challenges in the environmental monitoring. Another challenge is the complex mixture of contaminants present in the aquatic environment. In nearly all cases, non-polar hydrophobic chemicals coexist with polar hydrophilic chemicals. Thus even if the polar passive sampling devices were quantitative, different types of passive samplers would be needed to cover a full range of chemical pollutants increasing the cost and logistics of monitoring.

Disclosed herein are embodiments of sampling devices which comprise a novel sequestration media that can be used to monitor a very broad range of chemicals in water. Sampling devices as described herein have been shown to be as much as 1000 times more sensitive than previously disclosed devices and can cover a log $K_{ow}$ range of at least 0.01 to 10, with reliable performance throughout the entire range. Sampling devices as described herein offer the potential for unprecedented abilities in the range of chemicals that can be measured and the sensitivity of their measurement.

Embodiments of a new composite integrative passive sampler (CIPS) comprised of a continuous mesoporous sequestration phase embedded in a supporting microfiber membrane are disclosed herein. CIPS is a composite material different from SPMD in configuration; it also is different from the single-phased polymer samplers such as LDPE and PDMS membrane in their sequestration mechanisms, where partitioning is the sequestration mechanism for LDPE and PDMS, adsorption is the sequestration mechanism for CIPS. CIPS a composite membrane that does not have the sandwich or enclosure structure like POCIS and Chemcatcher. More importantly, the sequestration media of CIPS is an in-situ formed continuous mesoporous phase, while the sequestration media is a particulate sorbent for POCIS, and particulate sorbent immobilized in support material for Chemcatcher. The main advantages of CIPS are: (i) it can provide high sampling rates for polar pollutants, at least ten times higher than that of POCIS or Chemcatcher because its effective sampling surface area can be fabricated as large as that of SPMD and LDPE with low cost; and (ii) It can be used to simultaneously monitoring polar and non-polar contaminants in aquatic environment having log $K_{ow}$ values in a range of 0.01-10.

Embodiments of the present disclosure can include passive sampling membranes, continuous mesoporous sequestration media, methods of simultaneously sequestering polar and non-polar organic substances from a material such as a body of water, slurry, or the like.

An embodiment of the present disclosure includes an integrative passive sampler that includes a passive sampling membrane, which can be used for simultaneous sequestration of substances such as polar and non-polar organic substances from an environment (e.g., such as a body of water (e.g., lake, stream, pond, ocean and the like) and air, soil, sediment). In an embodiment, the passive sampler includes a mesoporous sequestration media having a sequestration phase and a support membrane. In an embodiment, the support membrane provides the mechanical strength for handling and environmental deployment and a support structure for the mesoporous polymer network, while the sequestration phase has the characteristic of being able to be synthesized in the support membrane and to provide simultaneous sequestration of polar and non-polar organic substances from the environment. As a result, an advantage of embodiments of the present disclosure include the low cost of materials, simplicity of making the media, ease of use as well as the ability to simultaneously sequester polar and non-polar organic substances using a single device.

In an embodiment, the support membrane can include a fiber sheet matrix. In an embodiment, the support membrane is a substrate for impregnation of the mesoporous sequestration media (e.g., the polymer) and to provide the mechanical strength for handling and environmental deployment. In an embodiment, the support membrane (e.g., microfiber membrane) itself is a micro/macro porous material having voids between fibers. The specific void volume (the void volume per gram of the microfiber membrane) is a factor that can determine the mass percentage of the mesoporous sequestration media. It is desirable to have a higher specific void volume; while this goal is balanced with the mechanical strength of the final product. In an embodiment, the specific void volume of about 25-99% (prior to application of the polymer) can be used depending on the material type of the microfiber membrane. In an embodiment, the material of the support membrane is chemically compatible with the monomer solution, which includes the hydrophobic and hydrophilic monomer as well as the porogen solvent (e.g., toluene) and subsequent washing and extraction solvents (e.g., methanol, acetone and dichloromethane).

In an embodiment, the support membrane can include a fiber sheet matrix and can include woven or non-woven natural fibrous materials and/or synthetic polymer fibers. In an embodiment, the support membrane can include a fiber sheet matrix which can include woven or non-woven natural fibrous materials and/or synthetic polymer fibers. In an embodiment, the natural fibrous material can include: cotton, flax, hemp, ramie, wool, silk, or a combination thereof. In an embodiment, the synthetic polymer microfiber can include inorganic microfiber or nanofiber membranes in woven or non-woven form. The inorganic microfiber or nanofiber membranes can be glassfiber, ceramic fiber, quartz fiber, carbon fiber and organic fiber membranes such as: regenerated cellulose, polyester, polyamide, polyurethane, polyacrylic, polytetrafluoroethylene (PTFE), polyvinylidene fluoride (PVDF), polyfluoroalkoxy (PFA), fluorinated ethylene propylene (FEP), and other fluorinated polymer with appropriate organic solvent compatibility.

In an embodiment, the support membrane can have a thickness of about 1 to 500 µm and in some instances thicker. In an embodiment, for example for integrative sampling (described in Example 1) the thickness can be about 100 to 500 µm, about 200 to 400 µm, or about 300 µm. In an embodiment, for example for an equilibrium passive sampler, the thickness can be about 1 to 100 µm, about 10 to 90 µm, about 20 to 80 µm, about 30 to 70 µm, about 40 to 60 µm, or about 50 µm. The width and length can vary depending upon the particular application and can be on the order of centimeters to meters.

In an embodiment, the sequestration phase is embedded in the support membrane. For example, the sequestration phase is formed around portions of the fibers of the support membrane to form the mesoporous network of pores that can absorb the polar and non-polar substances. In an embodiment, the sequestration phase is formed inside the support membrane by reacting the precursor monomers within the support membrane. The formed sequestration phase can be disposed on some (e.g., about 1 to 99%, about 1 to 50%, or about 25-75%) or all of the fibers of the support membrane. The degree of pore formation can be controlled by the reactants, the voids in the support member, and the like.

In an embodiment, the sequestration phase includes a polymer. In an embodiment, the sequestration phase includes a polymer having hydrophobic regions and hydrophilic regions. In particular, the hydrophobic region can correspond to a hydrophobic monomer(s) of the polymer and the hydrophilic region can correspond to a hydrophilic monomer(s) of the polymer. In an embodiment, the hydrophobic monomer can include one or more hydrophobic moieties or groups. In an embodiment, the hydrophilic monomer can include one or more hydrophilic moieties or groups.

In one embodiment, the hydrophilic monomer can include heteroatom monomers such as those containing nitrogen, oxygen, sulfur, phosphorus, chlorine, bromine and iodine in polar configurations. Other examples of hydrophilic monomers can include, for example, a saturated, unsaturated, or aromatic heterocyclic group (substituted or unsubstituted). Suitable examples include nitrogen-containing heterocyclic groups such as pyrrolidonyl and pyridyl groups (substituted or unsubstituted).

Hydrophilic monomers as described herein can include one or more hydrophilic moieties or groups. In certain embodiments, the hydrophilic group is an ether, ester, amine, aldehyde, ketone, alcohol, acid, or amide group, (substituted or unsubstituted). Hydrophilic monomers as described herein may comprise more than one type of hydrophilic moiety (aka group). In an embodiment, the hydrophilic monomer can be, for example, N-vinylpyrrolidone, 2-vinylpyridine, 3-vinylpyridine, 4-vinylpyridine or ethylene oxide, (substituted or unsubstituted).

In an embodiment, the hydrophobic monomer can include an aromatic carbocyclic group (substituted or unsubstituted), such as a phenyl or phenylene group, or an alkyl group, such as a straight chain or branched C2-C18-alkyl group. Suitable hydrophobic monomers include, but are not limited to, styrene and divinylbenzene.

In an embodiment, the molar percentage of the hydrophobic monomer and the hydrophilic monomer is about 8 to 95 molar percent. In a particular embodiment, the molar percentage of the N-vinylpyrrolidone/(N-vinylpyrrolidone+ divinylbenzene) can be about 2 to 98 molar percent.

In an embodiment, any of the monomers can be derivatized to contain any other chemical functional group (e.g., thiols, carboxylic acids, alkanes, alkenes, alkynes, arenes, alkyl halides, aryl halides, alcohols, phenols, ethers, aldehydes, ketones, esters, amides, amines, and nitriles) at any of one or more positions on the monomer.

In an embodiment, the continuous mesoporous sequestration media can have a specific surface area of about 1-850 $m^2/g$ or about 240 $m^2/g$. In certain embodiments, the sequestration media can have a specific surface area of about 100-750 $m^2/g$, about 200-650 $m^2/g$, about 300-450 $m^2/g$, or about 400 $m^2/g$. In an embodiment, the continuous mesoporous sequestration media can have an effective sampling area of about 1-12,000 $cm^2$, about 1000-11,000 $cm^2$, about 2000-10,000 $cm^2$, about 2000-9,000 $cm^2$, about 3000-8,000 $cm^2$, about 4000-7,000 $cm^2$, about 5000-6,000 $cm^2$, or about 1700 $cm^2$. The effective sampling area is defined as the surface area of both sides of the sequestration membrane. In an embodiment, the continuous mesoporous sequestration media can have pores having an average pore size of about 1 to 100 nm, about 10 to 90 nm, about 20 to 80 nm, about 30 to 70 nm, about 40 to 60 nm, about 50 nm, or about 7 nm. In certain embodiments, the continuous mesoporous sequestration media can have a specific void volume of about 1 to 99%, about 10 to 90%, about 20 to 80%, about 30 to 70%, about 40 to 60%, about 50%, or about 35%.

An embodiment of the present disclosure includes sampling substances in an environment such a body of water such as a lake, stream, river, pond, ocean and the like. Embodiments of the present disclosure can include sampling substances in air, soil, sediment, or biological material. Methods as described herein can include collecting a sample with a passive sampling membrane of the present disclosure, where the passive sampling membrane can be present in a protective cage or structure so that it is not compromised. The environment can include substances such as polar organic substances, non-polar organic substances, or a combination thereof. The passive sampling membrane can simultaneously sequester polar and non-polar organic substances from the environment.

In an embodiment, the substance can include, but is not limited to: persistent organic pollutants (POPs) including halogenated pesticides, herbicides, polychlorinated biphenyls (PCBs), polycyclic aromatic compounds (PACs), brominated flame retardants, dioxins, furans; current used pesticides and herbicides; contaminants of emerging concern including pharmaceuticals, personal care products, and household chemicals; chemicals used in commerce and disinfection byproducts; biotoxins; organic chemicals with different functional groups including alkanes, alkenes, alkynes, arenes, alkyl halides, aryl halides, alcohols, phenols, ethers, aldehydes, ketones, esters, amides, amines, nitriles, and nitrous compounds; and the metabolites and transformation products of all the above classes of environmental contaminants; and any combinations thereof.

In an embodiment, the substance sequestered by the membrane can have a concentration as low as about 0.001 nanograms per liter. In certain embodiments, the substance in an aquatic environment sequestered by the membrane can have a log $K_{ow}$ range of about 0.01 to 10, about 0.01 to 1, about 1 to 9, about 2 to 8, about 3 to 7, about 3 to 6, or about 4 to 5.

After the continuous mesoporous sequestration media are exposed to the body of water, the substances can be detected and quantitatively analyzed. Known techniques can be used to detect and quantify the type and amount of substance.

EXAMPLES

Example 1

Embodiments of the present disclosure provided here disclose a composite integrative passive sampler (CIPS) composed of a continuous mesoporous sequestration media having a continuous mesoporous sequestration phase embedded in a supporting microfiber membrane. CIPS is a composite material different from other configurations such as LDPE, PDMS and POM with a homogeneous polymer phase. CIPS is a composite membrane that does not have the sandwich or enclosure structure like other configurations such as POCIS and ChemCatcher. In particular, the sequestration media of CIPS is an in-situ formed continuous mesoporous phase, unlike other configurations. A few advantages of CIPS can include: (i) it can provide high sampling rates for polar pollutants, at least ten times higher than that of other configurations because its effective sampling surface area can be fabricated to suitable dimensions. (ii) It can be used to simultaneously monitor polar and non-polar contaminants in aquatic environment having log $K_{ow}$ values in a range of about 0.1-10 or even broader.

For integrative sampling, the mesoporous sequestration media serves as a sink in the mass transport of chemicals from aqueous phase to the sorbent phase. Therefore, a thick microfiber membrane having a thickness of about 100 μm to 10 mm can be used. The thickness of the microfiber membrane governs the specific mass/area ratio, which in turn governs the adsorption capacity and the timeframe of the linear range of uptake kinetics of the integrative passive sampler. A one-month linear uptake range was obtained using CIPS with a cellulose membrane having a thickness of 300 μm.

Another embodiment of present disclosure includes synthesizing a composite equilibrium passive sampler (CEPS) by impregnation of the mesoporous sequestration media in a thin microfiber membrane (about 1 μm to 100 μm), which can be used as an equilibrium sampler to provide the equilibrium concentration of the target substance (and thus a measure of desorbable and bioavailable chemical from sediment or soil) [9-11]. Passive sampling devices that are allowed to reach equilibrium with water-particle (soil or sediment) slurries have shown promise in estimating the readily desorbable and potentially bioavailable fraction of chemicals in soil and sediment [9, 11, 12].

Currently, several polymer samplers such as POM, LDPE and PDMS are used as equilibrium samplers. The advantages of the polymer equilibrium samplers are inexpensive, commercially available, and large surface area to volume ratio. However, these polymer samplers can only be used for hydrophobic compounds having log $K_{ow}$ values>4. To our knowledge, there is no equilibrium passive sampler that can be used for polar compounds yet. As metabolites and transformation products of hydrophobic contaminants are more polar than the parent compound and new emerging contaminants such as new pesticide, herbicide, personal care products and pharmaceuticals are polar compounds, there is an urgent need for equilibrium passive sampler for polar contaminants. CEPS, bearing all the advantages of other techniques, can be used for measuring the equilibrium concentrations of both polar and non-polar compounds in water, sediment, soil, and air. In an embodiment, the CEPS can have a sequestration membrane that can be thin so that sorption equilibrium can be achieved in a reasonable time frame (for example within two weeks).

In one embodiment, the continuous mesoporous sequestration phase is synthesized from a hydrophobic monomer such as divinylbenzene and a hydrophilic monomer such as N-vinylpyrrolidone. The hydrophobicity of this embodiment can be adjusted by changing the molar ratio of the hydrophobic and hydrophilic monomers. A molar percentage [N-vinylpyrrolidone/(N-vinylpyrrolidone+divinylbenzene)] in the range of about 2-98 provides excellent sequestration capacity for polar compounds as well as non-polar compounds. The sequestration phase is also water-wettable, therefore, no special solvent wetting procedures are required in the field before deployment. The sorbent polymers used in the methods of the present disclosure can be prepared via standard synthetic methods. For example, a poly(divinylbenzene-co-N-vinylpyrrolidone) copolymer can be synthesized by copolymerization of divinylbenzene and N-vinylpyrrolidone using standard methods of free radical polymerization which are well known in the art. One method for forming copolymers of this type is disclosed in U.S. Pat. No. 4,382,124, issued to Meitzner et al. [13], and U.S. Pat. No. 5,882,521, issued to Bouvier et al. [14], the contents of which are incorporated herein by references.

Microfiber Membrane Preparation.

Whatman cellulose filter paper and cotton fabric were used as microfiber membranes. The filter paper was cut to sizes of 6"×11" or 6"×22" and used directly for subsequent impregnation polymerization. The cotton fabric was cut to size of 6"×11" and cleaned by Soxhlet extraction using 50% acetone/dichloromethane for 72 h. The cleaned cotton fabric sheets were dried in air for subsequent impregnation polymerization.

Monomer Solution Preparation.
1. Measure 200 mL Divinylbenzene (SigmaAldrich 414565-1L, technical grade having 86% purity) in a 1000 mL Erlenmeyer flask.
2. Measure 100 mL N-vinyl-2-pyrrolidone (SigmaAldrich V3409-1KG, 99%) into the same flask.
3. Weigh 2.00 g Azobisisobutyronitrile (SigmaAldrich, 441090-25G) into the same flask.
4. Measure 350 mL Toluene into the same flask.
5. Stir the formula using a glass bar until the catalyst dissolves completely.
6. Cover the monomer solution for subsequent application.

Impregnation Polymerization.
1. A microfiber membrane (filter paper or cotton fabric) was flattened on an aluminum foil sheet.
2. A desired quantity of the monomer solution was measured onto the microfiber membrane until uniformly saturated.
3. The aluminum foil sheet was folded in all sides and flattened to get rid of any air bubbles and sealed by folding the edges of the aluminum foil sheet.
4. The folded aluminum sheets were stacked in a deep stainless steel pan; the pan was covered with aluminum foil and placed in a water bath.
5. The impregnation polymerization was conducted by heating the temperature of the water bath to 70° C. and hold for 24 h.
6. After the completion of the impregnation polymerization, the aluminum foil was opened from the edges to obtain the divinylbenzene-N-vinylpyrrolidone copolymer impregnated microfiber membrane.
7. The copolymer impregnated microfiber membrane was alternatively cleaned by methanol and 50% acetone/dichloromethane to remove any residual monomer, porogen solvent, catalyst and polymerization by products.
8. The solvent cleaned CIPS is then vacuum dried and sealed with aluminum foil or sealed in glass bottle to prevent CIPS from uptaking any chemical from the ambient air.

Characterization and Performance Test of Synthesized CIPS

An optical image of CIPS having an effective surface area of 1703 cm$^2$ is shown in FIG. 1. Several commonly used samplers are also imaged for comparison: POM having an effective surface area of 425 cm$^2$; LDPE having an effective surface area of 425 cm$^2$; and POCIS having effective surface area of 41 cm$^2$. The sandwiched structure of POCIS is also illustrated in FIG. 1. The complex structure of POCIS made of stainless steel with particulate sorbent sandwiched between two selective membranes leads to high cost in fabrication, but only provides a fraction of the effective surface area of the commonly used LDPE and POM and specifically excludes many chemicals due to the membranes. The primary difference of POCIS is its capacity in sequestration of only polar compounds while LDPE and POM can only be used for hydrophobic compounds. On the contrary, the effective surface area of CIPS can be fabricated 48 times higher than POCIS at a fraction of the cost of POCIS. More importantly, CIPS can be used for simultaneous sequestration of polar and non-polar organic substances from aquatic environment with unprecedented sensitivity, particularly for polar compounds as demonstrated in the performance test result provided in the flowing context.

We first examined the successful synthesis of CIPS with a continuous mesoporous sequestration phase imbedded in a microfiber membrane. As shown in FIG. 1, the microfiber membrane was Whatman filter paper made of regenerated cellulose; a monomer solution composed of monomers, catalyst and porogen agent in desired formula was applied onto the filter paper. A continuous mesoporous polymeric phase was formed in the microfiber matrix of the filter paper after polymerization at elevated temperature.

Figure 2:
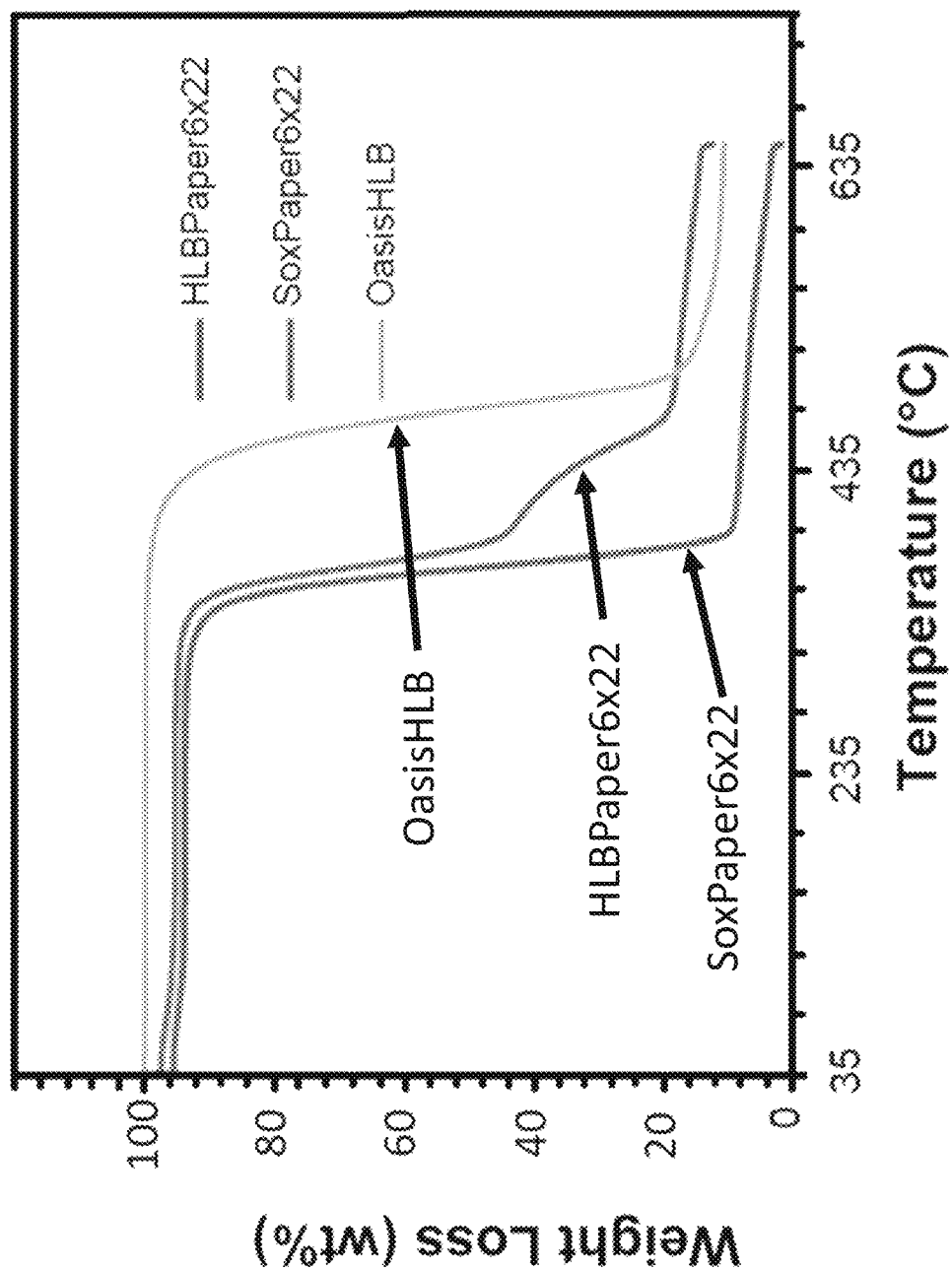
FIG. 2 illustrates TGA analysis of CIPS, the microfiber substrate and the standard polymeric material of CIPS.

The bulk phase property of CIPS was studied by using thermal gravimetric analysis (TGA). TGA is a method of thermal analysis in which changes in physical and chemical properties of materials are measured as a function of increasing temperature (with constant heating rate). FIG. 2 shows the TGA profiles of the microfiber membrane (SoxPaper6×22 in red), a particulate sorbent (OasisHLB) commercially available for solid-phase extraction, and CIPS synthesized by the present disclosure (HLBPaper6×22).

The Oasis HLB (Hydrophilic-Lipophilic-Balanced) particulate sorbent was made of divinylbenzene-N-vinylpyrrolidone copolymer. The microfiber membrane pyrolysis occurred at 366° C.; the commercial Oasis HLB at 478° C., while CIPS had two transitions in the pyrolysis curve at 366° C. and 449° C. The two transitions in pyrolysis temperature reveal that CPIS was composed of two independent phases, a cellulose phase of the microfiber membrane and a copolymer phase of divinylbenzene-N-vinylpyrrolidone.

Figure 3:
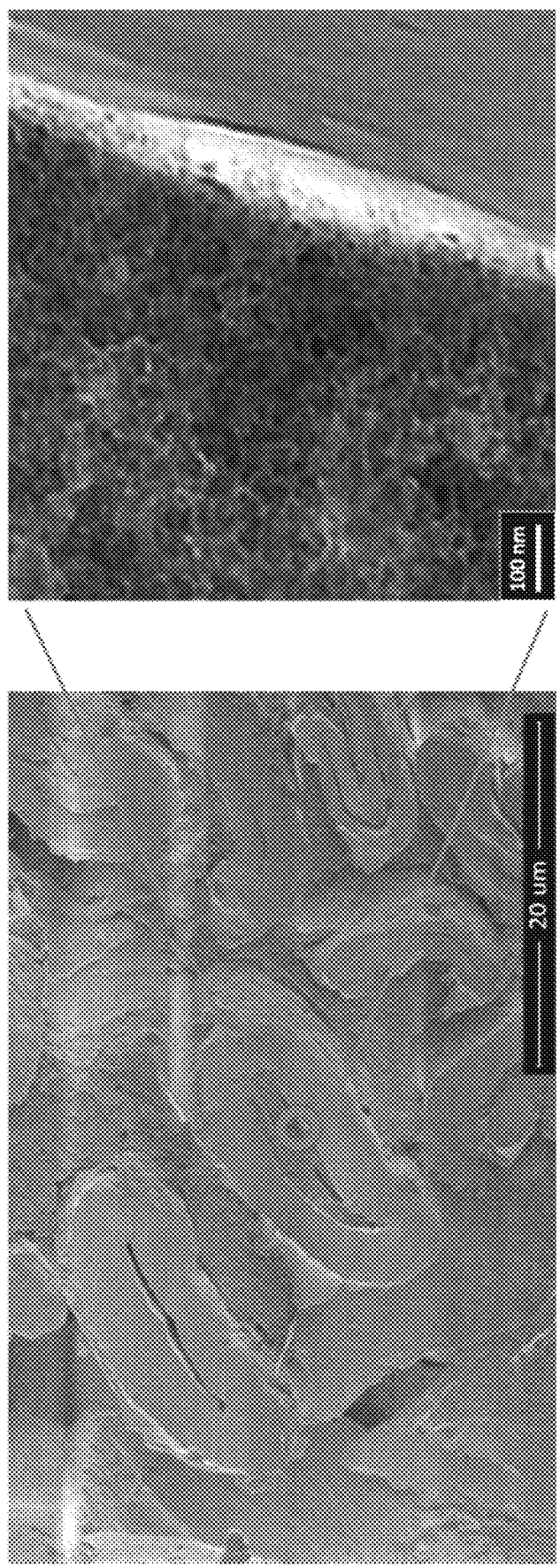
FIG. 3 shows two-phase microstructure of CIPS examined by using SEM (image on the left) and TEM (image on the right). The TEM image is an explosion image of a local section on the SEM in higher magnification.

The two-phase microstructure of CIPS was further examined by using a scanning electron microscope (SEM) and transmission electron microscope (TEM) shown in FIG. 3. The two-phase microstructure of CIPS examined by using SEM (image on the left) and TEM (image on the right) are shown in FIG. 3. The continuous polymeric phase imbedded in the microfiber matrix is clearly identified in the SEM image. It is interesting to note that the polymeric phase could also enter and fill the cavity of the microfiber. The highly porous microstructure of CIPS can be seen on the TEM image. The TEM image is an explosion image of a local section on the SEM in higher magnification. The TEM image also reveals that the microporous polymeric phase does not mix with the microfiber; this observation is consistent with the two-phase result from the TGA analysis (FIG. 2). These results demonstrate that the polymer phase of CIPS is independent of the substrate material; therefore, its passive sampling performance will not be affected by the substrate providing a new generation of non-selective material for PSDs.

The mesoporous structure of CIPS is further examined by measuring its specific surface area using the BET method. The BET surface area was measured by using an ASAP2020 Physisorption Analyzer. Nitrogen gas ($N_2$) was used as analysis adsorptive. Sample was degassed at 80° C. for 16 h and the sample weight taken after degassing was used for specific surface area calculation. The BET surface area of the microfiber membrane (SoxPaper) was 1.2 $m^2/g$. The BET surface area of Oasis HLB particulate sorbent was measured to be 773 $m^2/g$ with an average pore size of 6.9 nm; these values are consistent with the manufacture reported specific surface area of 810 $m^2/g$ with an average pore size of 8 nm. The BET surface area of CIPS was measured to be 238 $m^2/g$ with an average pore size of 7.4 nm. The difference in specific surface area of the microfiber membrane and CIPS reveals that the specific surface area of CIPS resulted from the synthesized polymeric phase. The mesoporous microstructure of the polymeric phase of CIPS is similar to that of commercial Oasis HLB particle sorbent having an average pore size about 7 nm. The reason the specific surface area of Oasis HLB is larger than that of CIPS is due to the fact that a large fraction of the mass of CIPS comes from the microfiber supporting material.

For passive sampling applications, the surface physicochemical property of a sampler is critical. For example, Oasis HLB sorbent can be used for the extraction of polar and non-polar compounds from aqueous solution in solid-phase extraction application, while POCIS composed of Oasis HLB particulate sorbent sandwiched between two polyethersulfone (PES) membranes only can be used for polar compounds. This is because the PES membrane can adsorb very hydrophobic chemicals and cause significant lag time in passive sampling of very hydrophobic chemicals.

Figure 4:
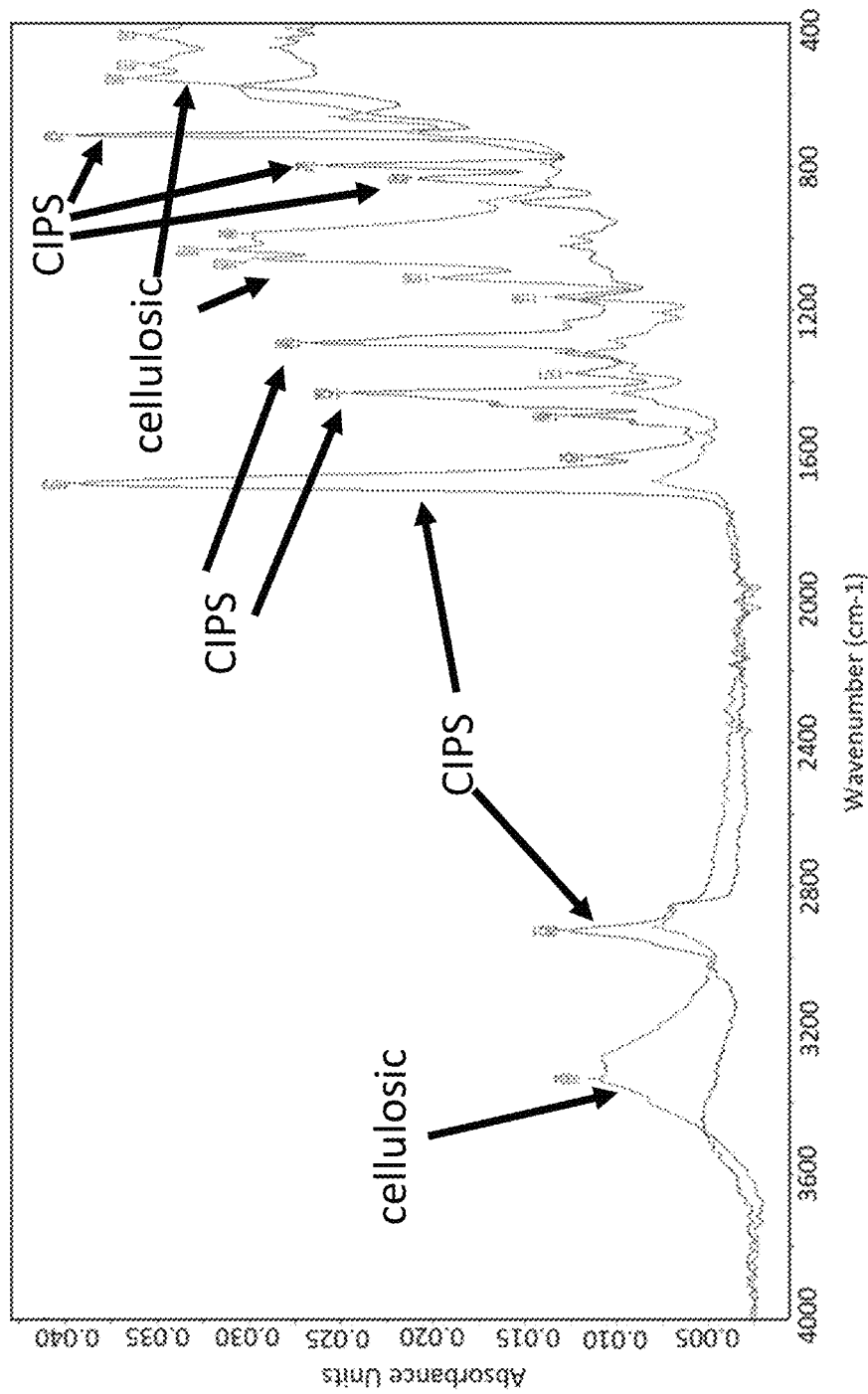
FIG. 4 illustrates CIPS characterization using attenuated total reflection (ATR)-FTIR. CIPS is in blue and the cellulosic membrane in red.

The composition of CIPS was studied by using attenuated total reflection (ATR)-Fourier transform infrared spectroscopy (FTIR) (FIG. 4); ATR is a sampling technique used in conjunction with infrared spectroscopy which enables sample surface to be examined directly with a penetration depth into the sample typically between 0.5 and 2 micrometers. The surface of CIPS is primary covered with divinylbenzene-N-vinylpyrrolidone copolymers (blue), which essentially covered the cellulosic microfiber substrate (red).

Figure 5:
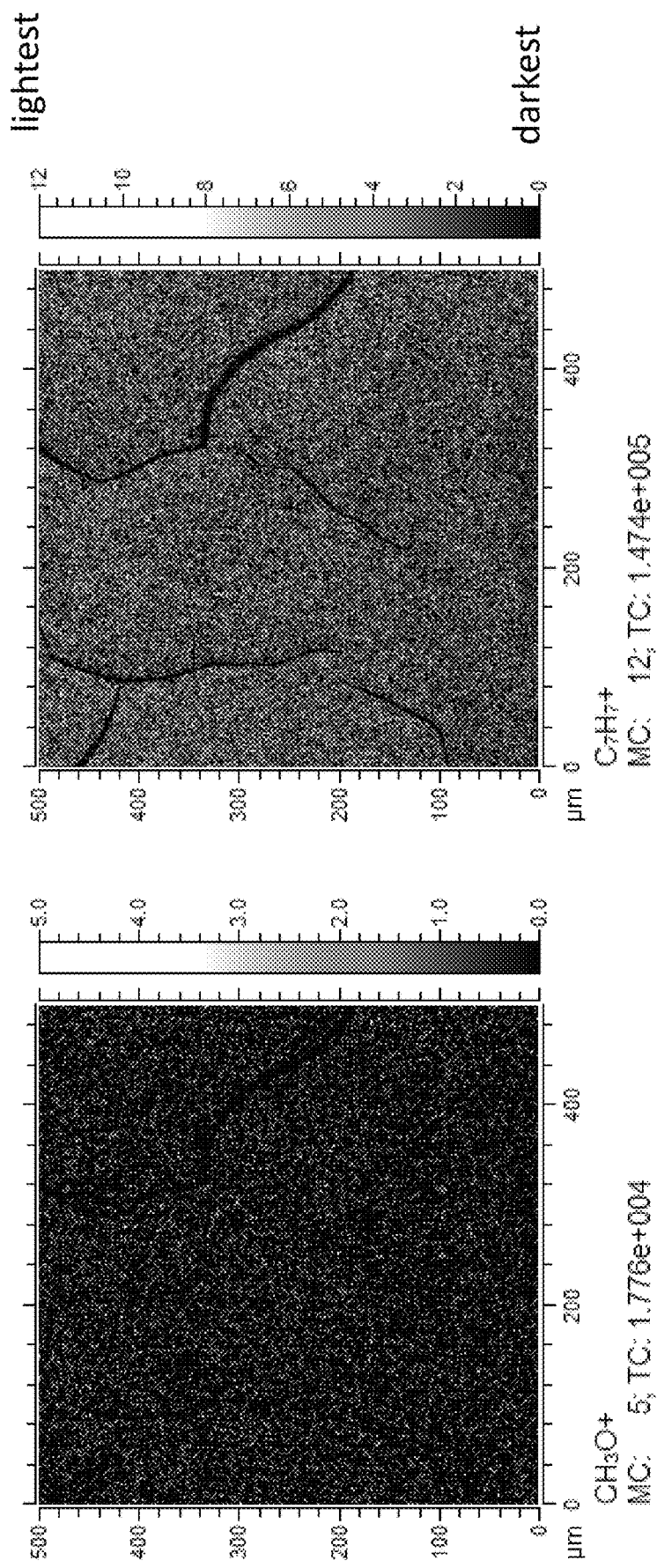
FIG. 5 illustrates CIPS characterization using TOF-SIMS, with the darker microfiber matrix on left and brighter red mesoporous sequestration media on right.

The surface composition of CIPS was also studied by using time of flight-secondary ion mass spectrometry (TOF-SIMS). TOF-SIMS is a surface sensitive technique to characterize the surface chemical species. TOF-SIMS is a method to characterize the surface chemical composition, with dark red reflecting the CH3O+ ions of cellulose fibers in the microfiber matrix (FIG. 5 left) and brighter red reflecting the C7H7+ of the mesoporous sequestration media (FIG. 5 right) showing the surface chemistry of CIPS. The character ion of $C_7H_7^+$ reveals that a divinylbenzene-pyrrolidone copolymer is formed on the surface of the CIPS composite membrane.

Figure 6A:
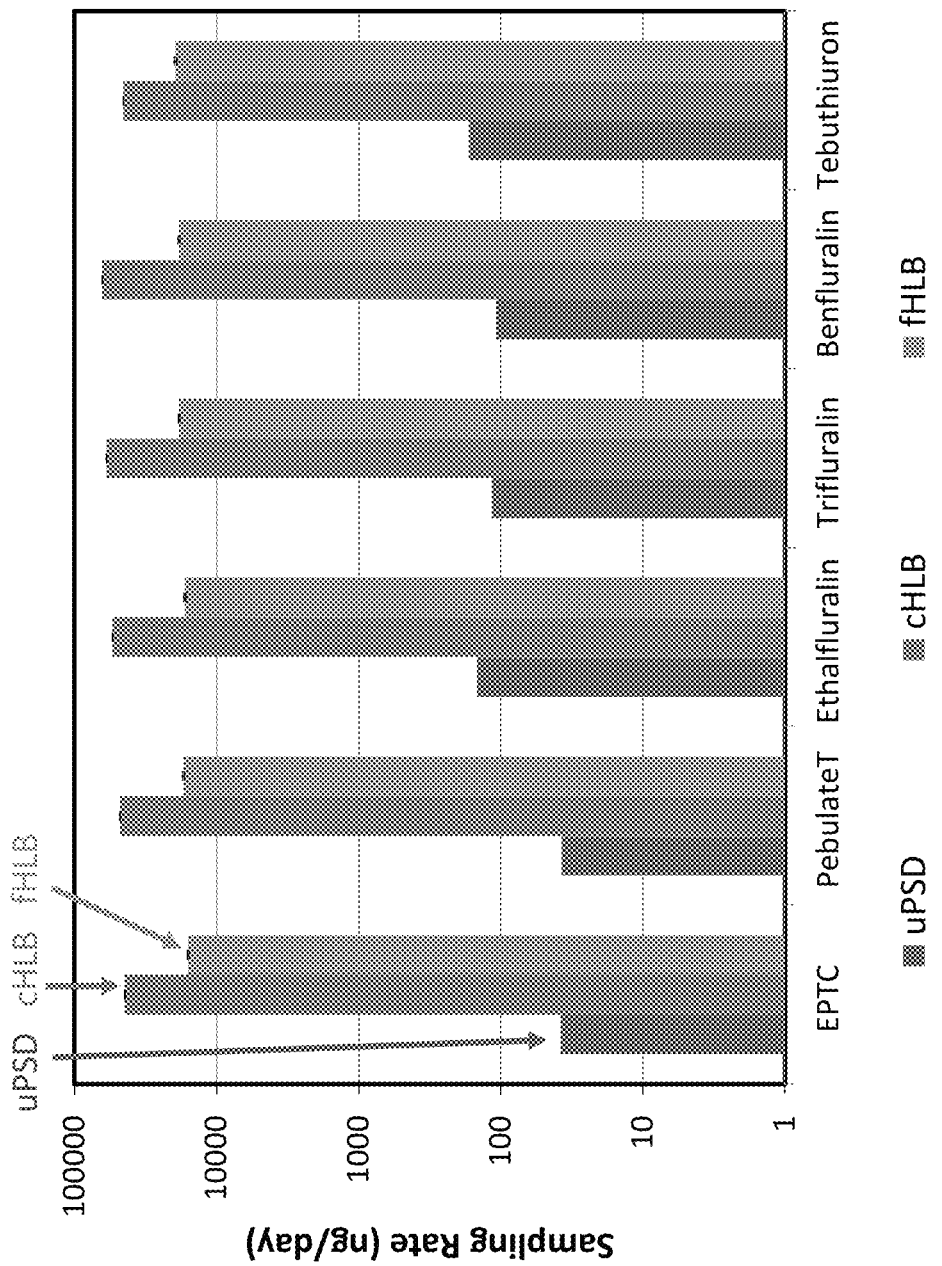
FIGS. 6A and 6B show sampling rates of the samplers for 6 representative pesticides (6A) and the relationship of the sampling quantities of the 6 pesticides with effective surface area of the three samplers (6B).
Figure 6B:
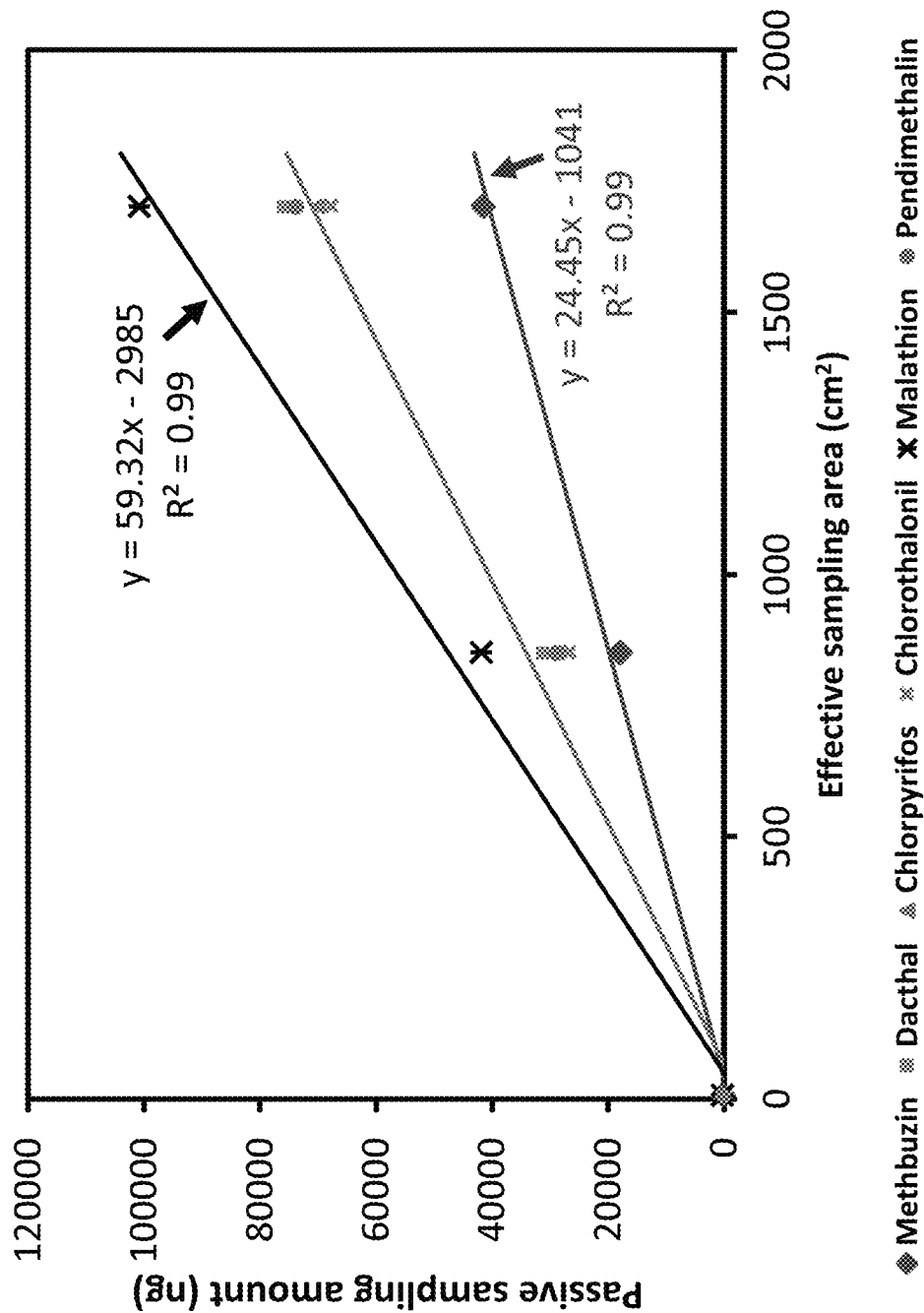

The performance of CIPS in the passive sampling of 49 pesticides was studied in a flow-through water exposure system for 5 days. The pesticides covered a log $K_{ow}$ range of 0.2 to 8.0. The water volume in the sampler deployment compartment was 21.7 L and the water flow rate was 16 L/h. A stock solution of the 49 pesticides was prepared in methanol with a concentration of 900 ng/mL for each of the pesticides. A high-performance liquid chromatographic pump was used to deliver a constant flow (100 μL/min) of the pesticide stock solution into the water flow, which resulted in a pesticide concentration of 335 ng/L (individual component) in the passive sampler compartment. The passive sampling performances of three types of passive samplers are shown in FIG. 6. The uPSD was a sampler composed of Oasis HLB particulate sorbent within a porous stainless steel cartridge having an effective sampling area of 6.9 $cm^2$. The porous stainless steel retained the Oasis HLB particulate sorbent within the uPSD similar to the PES membrane of POCIS. The cHLB was a CIPS having an effective sampling area of 1703 $cm^2$ synthesized using cellulose filter paper as microfiber membrane. The fHLB was a CIPS having an effective sampling area of 851 $cm^2$ synthesized using cotton fabric as microfiber membrane. The sampling rate of the cHLB was almost 1000 times higher than uPSD (FIG. 6A). The sampling rates of the different samplers show a linear relationship with their effective surface area (FIG. 6B) under the same experimental conditions.

Example 2

Field Testing of CIPS Compared to POCIS and LDPE

Figure 7A:
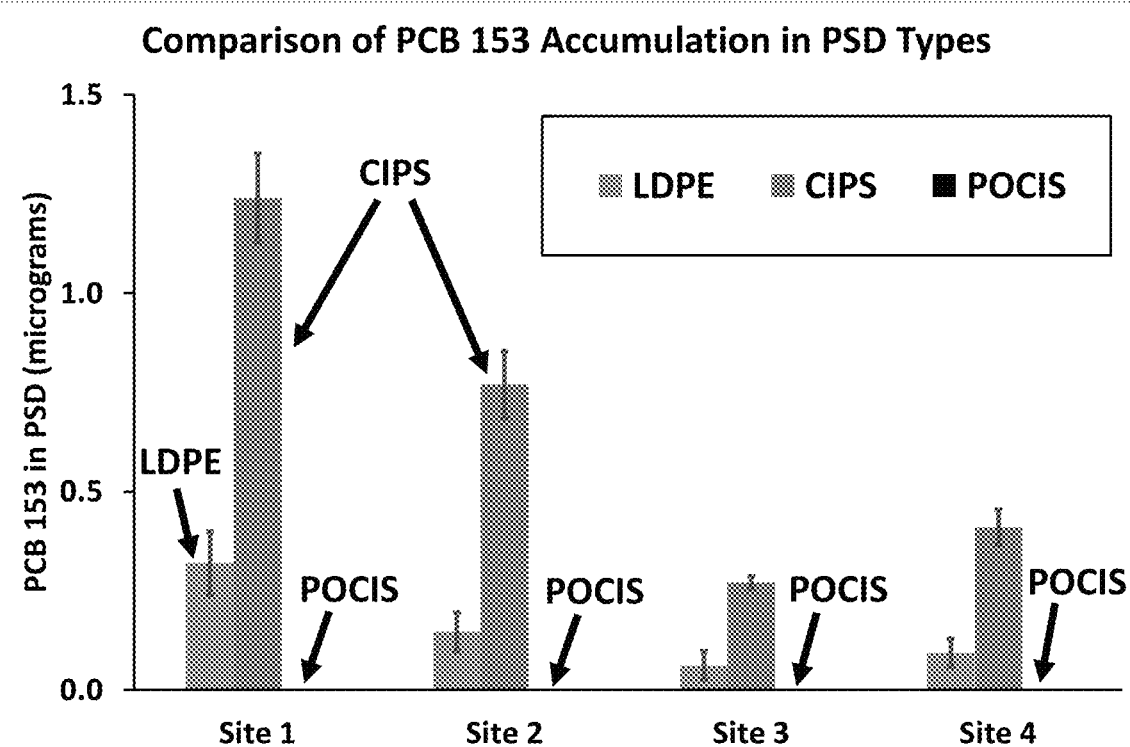
FIGS. 7A and 7B show a comparison of the accumulation of PCB 153 (FIG. 7A) and atrazine (FIG. 7B) in CIPS versus LDPE and POCIS at four field sites in natural waters contaminated with PCB and atrazine.
Figure 7B:
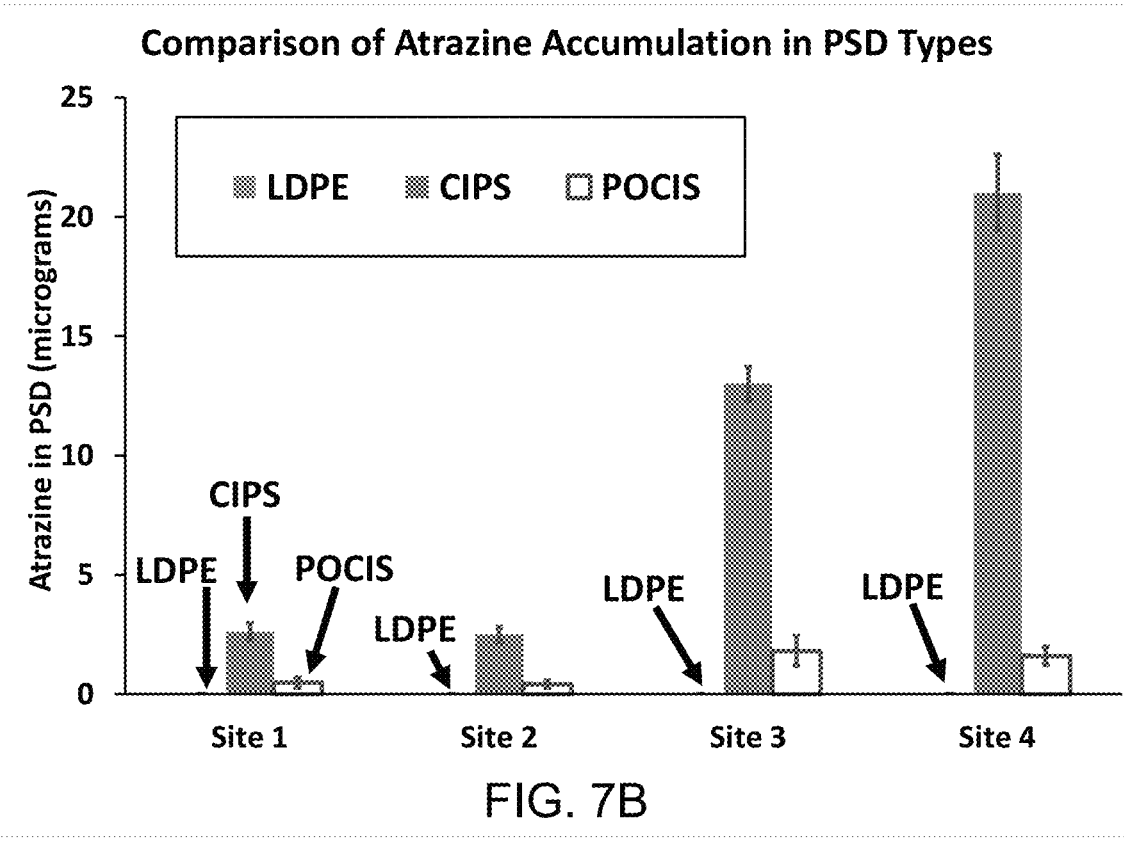

The ability of CIPS to accumulate both polar and non-polar chemicals in environmental waters was compared to that of POCIS and LDPE by deploying each sampler type in the Yadkin River, N.C., USA where the water is contaminated with PCBs and the pesticide atrazine. PCBs are very hydrophobic, with PCB 153 having a log $K_{ow}$ value of 7.7 and atrazine is much more hydrophilic with a log $K_{ow}$ value of 2.7. The accumulation of these very different chemicals in to the CIPS, POCIS and LDPE are shown in FIG. 7. The samplers were deployed at four different sites having different concentrations of the PCB 153 (FIG. 7A) and atrazine (FIG. 7B). The POCIS accumulates atrazine but does not accumulate PCB 153. The LDPE accumulates PCB 153 but does not accumulate atrazine. The CIPS accumulates both atrazine and PCB 153, demonstrating its primary great advantage over the CIPS and LDPE. The CIPS also accumulated greater amounts of each chemical (FIGS. 7A and 7B) demonstrating its higher sensitivity compared to the POCIS or LDPE. The CIPS also exhibited lower variability among the three replicates deployed at each site compared to POCIS and LDPE (FIGS. 7A and 7B). For atrazine, the average relative standard deviation of the mean value of the four field sties was 9.81% for CIPS and 33.89% for POCIS, while atrazine was not detected in the LDPE. For PCB 153, the relative standard deviation of the mean value of the four field sites was 9.15% for CIPS and 38.41% for LDPE, while PCB 153 was not detected in the POCIS.

Figure 8:
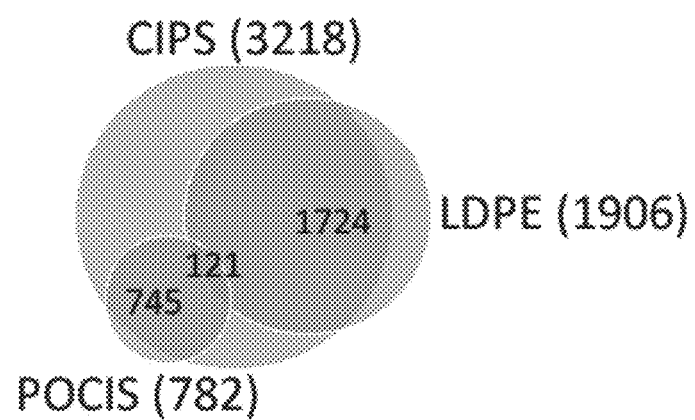
FIG. 8 shows a comparison of the total number of chemicals detected in CIPS versus LDPE and POCIS in a field-collected water sample.

A further comparison of CIPS to POCIS and LDPE was made by counting the total number of chemicals detected in each device using liquid chromatography coupled to high resolution mass spectrometry (Thermo Scientific Q Exactive Plus instrument) (FIG. 8). A total of 3218 chemicals were detected in the CIPS, whereas only 782 chemicals were detected in the POCIS and 1906 chemicals detected in the LDPE. And the CIPS almost exactly captured the sum of those chemicals detected in the POCIS and LDPE, plus additional chemicals that were not detected in either the POCIS or LDPE.

Example 3

The molar ratio of the hydrophobic and hydrophilic monomers is determinant factor governing the hydrophobicity and wettability of the mesoporous sequestration phase, which in-turn affects the application range and performance of the final product. Increasing the molar ratio of hydrophilic monomer would enhance wettability and improve the affinity toward polar compounds. A series of products with different molar ratios of hydrophobic and hydrophilic monomers can be produced for different monitoring targets such as the new emerging concern of polar pollutants, hydrophobic PAH release from oil spill or monitoring both hydrophobic parent compounds and polar metabolites and transformation products of the parent compounds.

For example, while maintaining all other experimental conditions such as reaction temperature, time, amount of catalyst and porogen agent used and the impregnation procedures, a product with a molar percentage [N-vinylpyrrolidone/(N-vinylpyrrolidone+divinylbenzene)] of 62% was obtained by using 150 mL Divinylbenzene and 150 mL N-vinyl-2-pyrrolidone in the monomer solution preparation. Molar percentage was calculated from the volume, density, and molar mass of hydrophobic and hydrophilic monomers.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

REFERENCES

1. Alvarez, D A, Cranor, W L, Perkins, S D, Clark, R C, and Smith, S B, *Chemical and toxicologic assessment of organic contaminants in surface water using passive samplers.* Journal of environmental quality, 2008. 37(3): p. 1024-1033.
2. Huckins, J N, Petty, J D, and Booij, K, *Monitors of organic chemicals in the environment: semipermeable membrane devices.* Monitors of organic chemicals in the environment: semipermeable membrane devices, 2006.
3. Huckins, J N, Lebo, J A, Tubergen, M W, Manuweera, G K, Gibson, V L, and Perry, J D, *Binary concentration and recovery process.* Binary concentration and recovery process, 1992.
4. Mills, G A, Gravell, A, Vrana, B, Harman, C, Budzinski, H, Mazzella, N, and Ocelka, T, *Measurement of environmental pollutants using passive sampling devices—an updated commentary on the current state of the art.* Environmental science. Processes & impacts, 2014. 16(3): p. 369-373.
5. Seethapathy, S, Górecki, T, and Li, X, *Passive sampling in environmental analysis.* Journal of chromatography. A, 2008. 1184(1-2): p. 234-253.
6. Martinez Bueno, M J, Herrera, S, Munaron, D, Boillot, C, Fenet, H, Chiron, S, and Gomez, E, *POCIS passive samplers as a monitoring tool for pharmaceutical residues and their transformation products in marine environment.* Environ Sci Pollut Res Int, 2016. 23(6): p. 5019-29.

7. Petty, J D, Huckins, J N, and Alvarez, D A, *Device for sequestration and concentration of polar organic chemicals from water*. Device for sequestration and concentration of polar organic chemicals from water, 2002.
8. Kingston, J, Greenwood, R, Mills, G, Morrison, G M, and Persson, L B B, *Aquatic passive sampling device and methods for its use*. 2006, U.S. Pat. No. 7,059,206.
9. Lydy, M J, Landrum, P F, Oen, A M, Allinson, M, Smedes, F, Harwood, A D, Li, H, Maruya, K A, and Liu, J, *Passive sampling methods for contaminated sediments: state of the science for organic contaminants*. Integrated environmental assessment and management, 2014. 10(2): p. 167-178.
10. Maaenpaa, K, Leppanen, M T, Reichenberg, F, Figueiredo, K, and Mayer, P, *Equilibrium sampling of persistent and bioaccumulative compounds in soil and sediment: comparison of two approaches to determine equilibrium partitioning concentrations in lipids*. Environmental science & technology, 2011. 45(3): p. 1041-1047.
11. Mayer, P, Parkerton, T F, Adams, R G, Cargill, J G, Gan, J, Gouin, T, Gschwend, P M, Hawthorne, S B, Helm, P, Witt, G, You, J, and Escher, B I, *Passive sampling methods for contaminated sediments: scientific rationale supporting use of freely dissolved concentrations*. Integrated environmental assessment and management, 2014. 10(2): p. 197-209.
12. Cornelissen, G, Pettersen, A, Broman, D, Mayer, P, and Breedveld, G D, *Field testing of equilibrium passive samplers to determine freely dissolved native polycyclic aromatic hydrocarbon concentrations*. Environ Toxicol Chem, 2008. 27(3): p. 499-508.
13. Meitzner, E F and Oline, J A, *Process for preparing macroreticular resins, copolymers and products of said process*. Process for preparing macroreticular resins, copolymers and products of said process, 1983.
14. Bouvier, ESP, Meirowitz, R E, and McDonald, P D, *Water-wettable chromatographic media for solid phase extraction*. Water-wettable chromatographic media for solid phase extraction, 2004.

We claim:

1. A passive sampling membrane, comprising:
a continuous mesoporous sequestration media comprising a sequestration phase and a support membrane, the support membrane being configured to support the sequestration phase,
wherein the sequestration phase comprises a hydrophobic region and a hydrophilic region,
wherein the continuous mesoporous sequestration media is configured to simultaneously sequester polar and non-polar organic substances,
wherein the sequestration phase is a polymer,
wherein the polymer includes the hydrophobic region and the hydrophilic region, wherein the hydrophobic region corresponds to a hydrophobic monomer and the hydrophilic region corresponds to a hydrophilic monomer,
wherein the sequestration media is an in-situ formed continuous mesoporous phase embedded in the support membrane being a microfiber membrane, and
wherein the passive sampling membrane has no energy input.

2. The membrane of claim 1, wherein the support membrane further comprises a fiber sheet matrix.

3. The membrane of claim 2, wherein the fiber sheet matrix is selected from the group consisting of: cotton, flax, hemp, ramie, wool, silk, cellulose, polyester, polyamide, polyurethane, polyacrylic, polytetrafluoroethylene (PTFE), polyvinylidene fluoride (PVDF), polyfluoroalkoxy (PFA), fluorinated ethylene propylene (FEP), glassfiber, ceramic fiber, quartz fiber, carbon fiber, and a combination thereof.

4. The membrane of claim 1, wherein the hydrophobic monomer is selected from: styrene, divinylbenzene, or a combination thereof.

5. The membrane of claim 1, and wherein the hydrophilic monomer is selected from N-vinylpyrrolidone, 2-vinylpyridine, 3-vinylpyridine, 4-vinylpyridine, ethylene oxide, or a combination thereof.

6. The membrane of claim 1, wherein the molar percentage of the hydrophobic monomer and the hydrophilic monomer is about 8 to 95 molar percent.

7. The membrane of claim 1, wherein the hydrophilic monomer is N-vinylpyrrolidone, and wherein the molar percentage of the N-vinylpyrrolidone is about 2 to 98 molar percent.

8. The membrane of claim 1, wherein the media has a specific surface area of about 1-850 $m^2/g$, wherein the media has an effective sampling area of about 1-12000 $cm^2$—and/or wherein the media has a specific void volume between 1-99%.

9. A method for sampling substances in an environment, comprising:
collecting a sample with the passive sampling membrane of claim 1, wherein the substances in the sample include polar organic substances and non-polar organic substances, and wherein collecting includes simultaneously sequestering polar and non-polar organic substances from the environment.

10. The method of claim 9, wherein the environment can be air, aquatic, soil, or sediment.

11. The method of claim 10, wherein the environment is an aquatic environment and the substances sequestered by the membrane have a log $K_{ow}$ range of about 0.01 to 10.

12. The method of claim 9, wherein the substance is selected from the group consisting of: persistent organic pollutants (POPs), halogenated pesticides, herbicides, polychlorinated biphenyls (PCBs), polycyclic aromatic compounds (PACs), brominated flame retardants, dioxins, furans, pesticides, pharmaceuticals, personal care products, household chemicals, disinfection byproducts, biotoxins, alkanes, alkenes, alkynes, arenes, alkyl halides, aryl halides, alcohols, phenols, ethers, aldehydes, ketones, esters, amides, amines, nitriles and nitrous compounds, the metabolites and transformation products of all the above classes of substances, and a combination thereof.

13. The method of claim 9, wherein substance sequestered by the membrane has a concentration as low as about 0.001 nanograms per liter.

14. The method of claim 9, further comprising:
detecting one or more substances within the sample,
quantitatively analyzing the one or more substances, and
optionally screening non-target substances from the sample.

15. The method of claim 9, wherein the substance is selected from the group consisting of: persistent organic pollutants (POPs), pesticides, halogenated pesticides, herbicides, polychlorinated biphenyls (PCBs), polycyclic aromatic compounds (PACs), brominated flame retardants, dioxins, furans, pesticides, the metabolites and transformation products of all the above classes of substances, and a combination thereof.

16. A device comprising:
the passive sampling membrane of claim 1;
a protective container; and
a measuring device.

\* \* \* \* \*